(12) United States Patent
Hor (10) Patent No.: US 6,682,256 B1
(45) Date of Patent: Jan. 27, 2004

(54) FASTENING DEVICE (76) Inventor: Chiou-Pin Hor, No. 56, Alley 78, Sec. 1, Chung-Hwa Road, Hsinchu (TW)

( * ) Notice: Subject to any disclaimer, the term of this patent is extended or adjusted under 35 U.S.C. 154(b) by 28 days.

(21) Appl. No.: 10/188,875

(22) Filed: Jul. 3, 2002

(51) Int. Cl.$^7$ ................................................. E04G 7/00
(52) U.S. Cl. ..................... 403/382; 403/331; 403/363; 403/401; 403/403; 52/656.9
(58) Field of Search ................................. 403/382, 403, 403/331, 363, 401; 52/656.9, 655.1

(56) References Cited

U.S. PATENT DOCUMENTS

| | | | | |
|---|---|---|---|---|
| 984,267 A | * | 2/1911 | Ferres | 52/204.57 |
| 2,206,493 A | * | 7/1940 | Whatling | 249/194 |
| 2,588,818 A | * | 3/1952 | Franks | 403/217 |
| 2,912,013 A | * | 11/1959 | Freyholdt et al. | 138/160 |
| 3,323,819 A | * | 6/1967 | Barker | 403/402 |
| 3,485,405 A | * | 12/1969 | Dement | 217/65 |
| 3,979,875 A | * | 9/1976 | Susperregui Asensio | 403/205 |
| 4,123,863 A | * | 11/1978 | Becker | 40/758 |
| 4,446,585 A | * | 5/1984 | Harding et al. | 4/460 |
| 4,621,879 A | * | 11/1986 | Schneider | 312/258 |
| 5,033,901 A | * | 7/1991 | Dias | 403/172 |
| 5,319,906 A | * | 6/1994 | Hayden | 52/127.6 |
| 5,621,994 A | * | 4/1997 | Cobb et al. | 40/782 |
| 6,125,604 A | * | 10/2000 | Holmes | 52/713 |
| 6,171,013 B1 | * | 1/2001 | Lee | 403/231 |
| 6,536,984 B1 | * | 3/2003 | Ring et al. | 403/403 |
| 6,547,483 B2 | * | 4/2003 | Rae-Smith | 403/403 |

FOREIGN PATENT DOCUMENTS

| | | | |
|---|---|---|---|
| DE | 2330586 | * | 1/1975 |
| EP | 334565 | * | 3/1989 |
| GB | 2214595 | * | 6/1989 |

* cited by examiner

Primary Examiner—William Miller
Assistant Examiner—Carlos Lugo (57) ABSTRACT A fastening device includes two side boards attached to each other with an included angle therebetween and two securing members respectively and pivotally mounted to the side boards with a space formed between each securing member and the associated side board for accommodating a panel therebetween. A nut is rotatably fixed to the boards and linearly movable with respect to the boards whereby the nut is engageable with an edge protrusion of each securing member when subject to the linear movement. A bolt threadingly engages the nut. When the bolt is turned, the nut is linearly moved with respect to the side boards and forcibly drives the securing members to rotate with respect to the boards and thus securing the panels between the securing members and the side boards.

9 Claims, 9 Drawing Sheets

FASTENING DEVICE

FIELD OF THE INVENTION

The present invention relates generally to a fastening device, and in particular to a fastening device for quickly and readily securing side panels of a cabinet.

BACKGROUND OF THE INVENTION

A display cabinet comprises a frame made up of vertical columns and horizontal bars between which panels, made of glass or other materials, are fixed. Some of the conventional cabinets are designed to allow general consumers to assemble the cabinet by themselves. In other words, the cabinets are "do-it-yourselves" designs. Such "do-it-yourselves" design must be of no sophisticated configuration in order to allow the assembly of the cabinet parts to be readily carried out by the general consumers. However, the simple configuration sacrifices the mechanical stability of the cabinets. In other words, the cabinets of the "do-it-yourselves" usually do not have a sound structure and may easily collapse, causing damage to the general consumers.

It is thus desired to have a fastening device that allows quick and ready assembly of the "do-it-yourselves" cabinet without sacrificing the mechanical stability thereof.

SUMMARY OF THE INVENTION

An object of the present invention is to provide a fastening device for stably securing panels of a cabinet whereby the cabinet can be assembled quickly and readily without sacrificing mechanical stability thereof.

Another object of the present invention is to provide a fastening device for quickly, readily and stably securing panels of a cabinet to a frame of the cabinet, the fastening device also serving to support partition boards of the cabinet whereby the assembly of the cabinet is simplified.

A further object of the present invention is to provide a fastening device for securing panels and inside partition boards to a frame of a case or a cabinet for simplifying the assembly operation of the case or cabinet.

Yet a further object of the present invention is to provide a fastening device that secures panels of a cabinet in angles rather than 90 degrees thereby forming a hexagon or other multiple lateral side cabinet.

To achieve the above objects, in accordance with the present invention, there is provided a fastening device comprising two side boards attached to each other with an included angle therebetween and two securing members respectively and pivotally mounted to the side boards with a space formed between each securing member and the associated side board for accommodating a panel therebetween. A nut is rotatably fixed to the boards and linearly movable with respect to the boards whereby the nut is engageable with an edge protrusion of each securing member when subject to the linear movement. A bolt threadingly engages the nut. When the bolt is turned, the nut is linearly moved with respect to the side boards and forcibly drives the securing members to rotate with respect to the boards and thus securing the panels between the securing members and the side boards. The included angle can be any angle, such as 90 degrees and 120 degrees. The bolt has an expanded end extending into a cabinet formed with the fastening device for supporting a partition board of the cabinet.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE INVENTION

Figure 1:
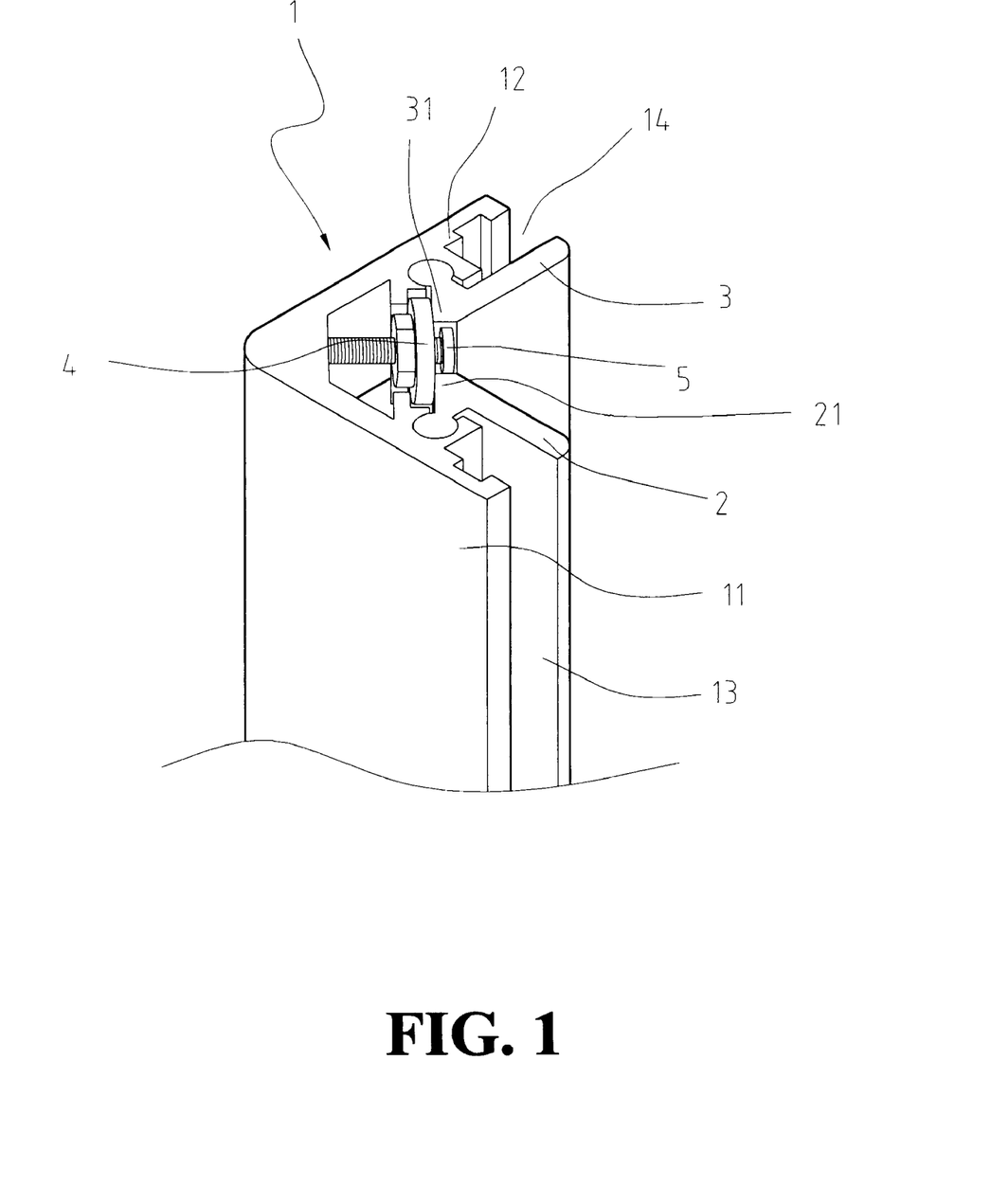
FIG. 1 is a perspective view of a fastening device constructed in accordance with the present invention.
Figure 2:
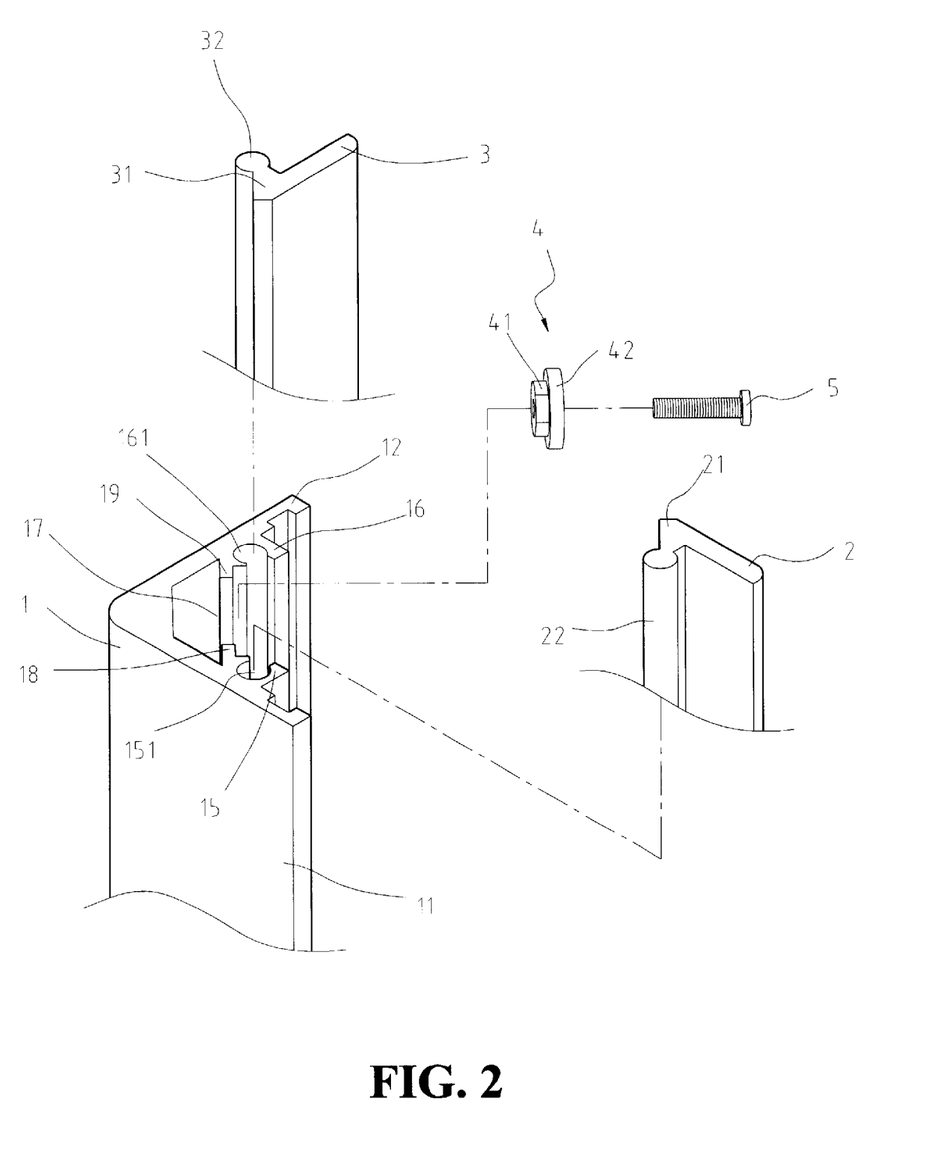
FIG. 2 is an exploded view of the fastening device of the present invention.

With reference to the drawings and in particular to FIGS. 1 and 2, a fastening device constructed in accordance with the present invention, generally designated with reference numeral 1, comprises first and second side boards 11, 12 connected to each other with a predetermined included angle therebetween. In the embodiment illustrated in FIGS. 1 and 2, the included angle between the boards 11, 12 is 90 degrees, but other angles can be formed.

Each side board 11, 12 forms a projection 15, 16 opposing each other. A rib 18, 19 is formed along each projection 15, 16 and confronting each other with a space 17 defined therebetween. Each projection 15, 16 defines a coextensive cylindrical bore 151, 161 and each bore 151, 161 has a side opening coextending therewith.

A securing member 2, 3 is pivotally mounted to each side board 11, 12 whereby a space 13, 14 is formed between each side board 11, 12 and the associated securing member 2, 3 for accommodating an edge of a panel 6 (FIG. 3) therein. The securing member 2, 3 has a cylindrical strip 22, 32 rotatably received in the corresponding cylindrical bore 151, 161 of the side board 11, 12. By means of the side opening of the bore 151, 161, the securing member 2, 3 is allowed to do limited rotation with respect to the associated side board 11, 12. Each securing member 2, 3 has an edge protrusion 21, 31 substantially opposite to the rib 18, 19 of the side board 11, 12.

A fastener comprises a nut 4 rotatably fixed in the space 17 and a bolt 5 threadingly engaging the nut 4. The nut 4 comprises a first section 41 that has a polygonal configuration and is sized so that two opposite edges of the first section 41 snugly engage opposing edges of the ribs 18, 19 whereby rotation of the first section 41 and thus the nut 4 is prevented by the engagement between the first section 41 and the ribs 18, 19 while linear movement or sliding of the first section 41 and thus the nut 4 with respect to the ribs 18, 19 in a direction substantially perpendicular to the ribs 18, 19 is allowed. The nut 4 has a second section 42 which in the embodiment illustrated has a size larger than the first section 41. The second section 42 is accommodated between the edge protrusions 21, 31 of the securing members 2, 3 and the ribs 18, 19 and is allowed to engage the edge protrusions 21, 31 of the securing members 2, 3.

Figure 3:
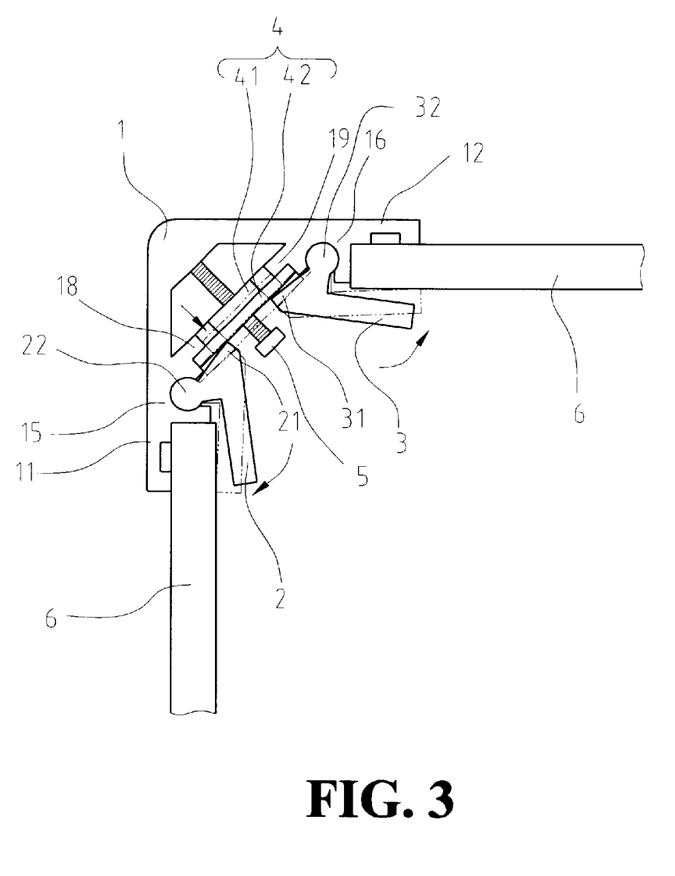
FIG. 3 is a top view of the fastening device of the present invention with two boards mounted thereto.

The bolt 5 that threadingly engages the nut 4 has a free end engages a connection (not labeled) between the side boards 11, 12 whereby by rotating the bolt 5, the nut 4 is forced to linearly move with respect to the ribs 18, 19 in the direction substantially perpendicular to the ribs 18, 19 and forcibly drives the edge protrusions 21, 31 to rotate the securing members 2, 3 with respect to the side boards 11, 12 thereby securing the panels 6 between the securing members 2, 3 and the associated side boards 11, 12 as shown in phantom lines of FIG. 3, as well as indicated by arrows in FIG. 3.

In practical applications, there may be a number of bolt-nut sets (5, 4) evenly distributed along and between the ribs 18, 19 of the side boards 11, 12 or the bolt-nut sets may be located at any desired positions along the ribs 18, 19. Further, the first section 41 of the nut 4 has a hexagonal cross section in the embodiment illustrated but other polygonal configurations mat also be employed provided a snug engagement can be formed between the first section 41 of the nut 4 and the ribs 18, 19 to prevent rotation of the nut 4.

Figure 4:
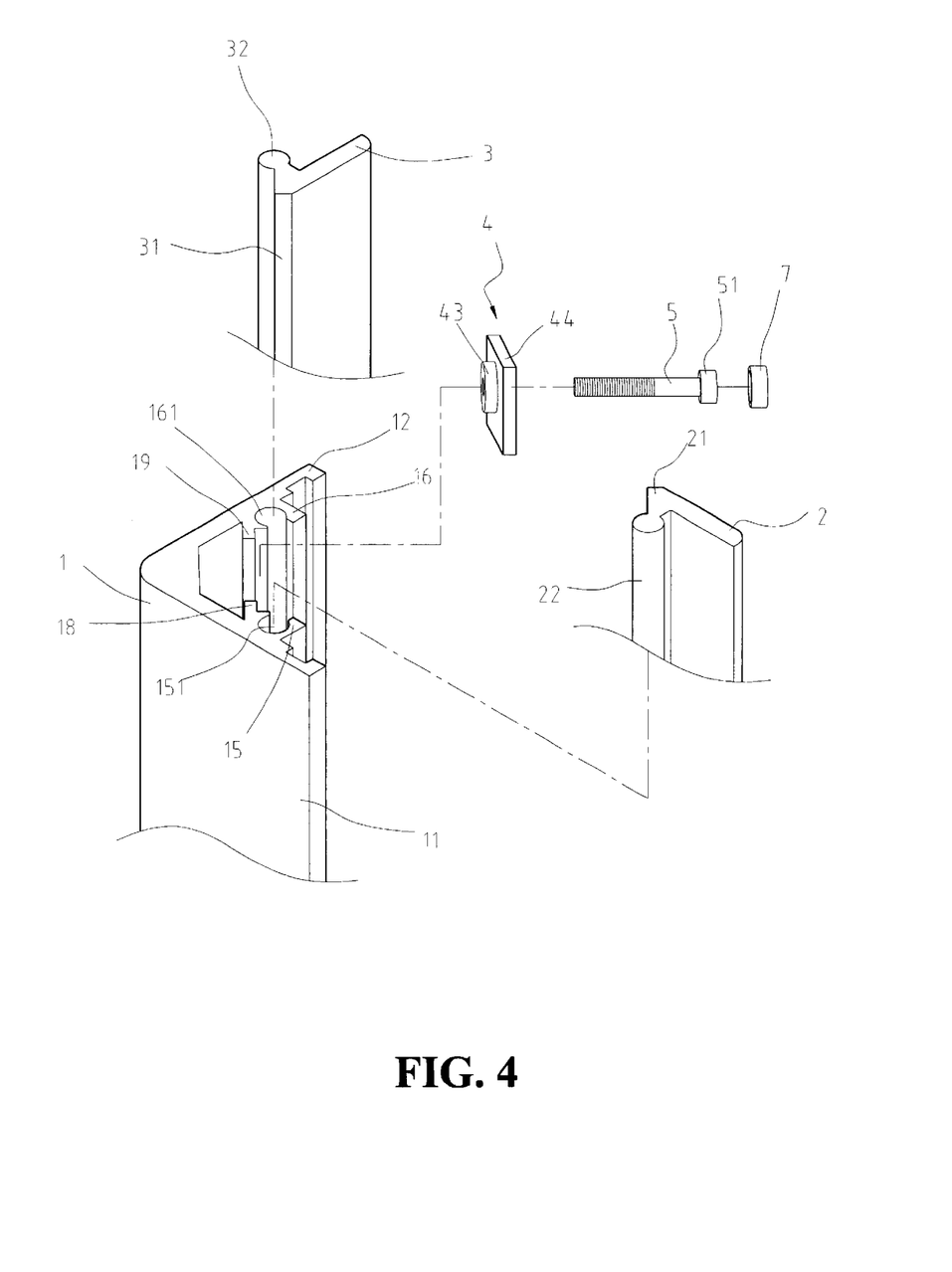
FIG. 4 is an exploded view of a fastening device constructed in accordance with another embodiment of the present invention.
Figure 5:
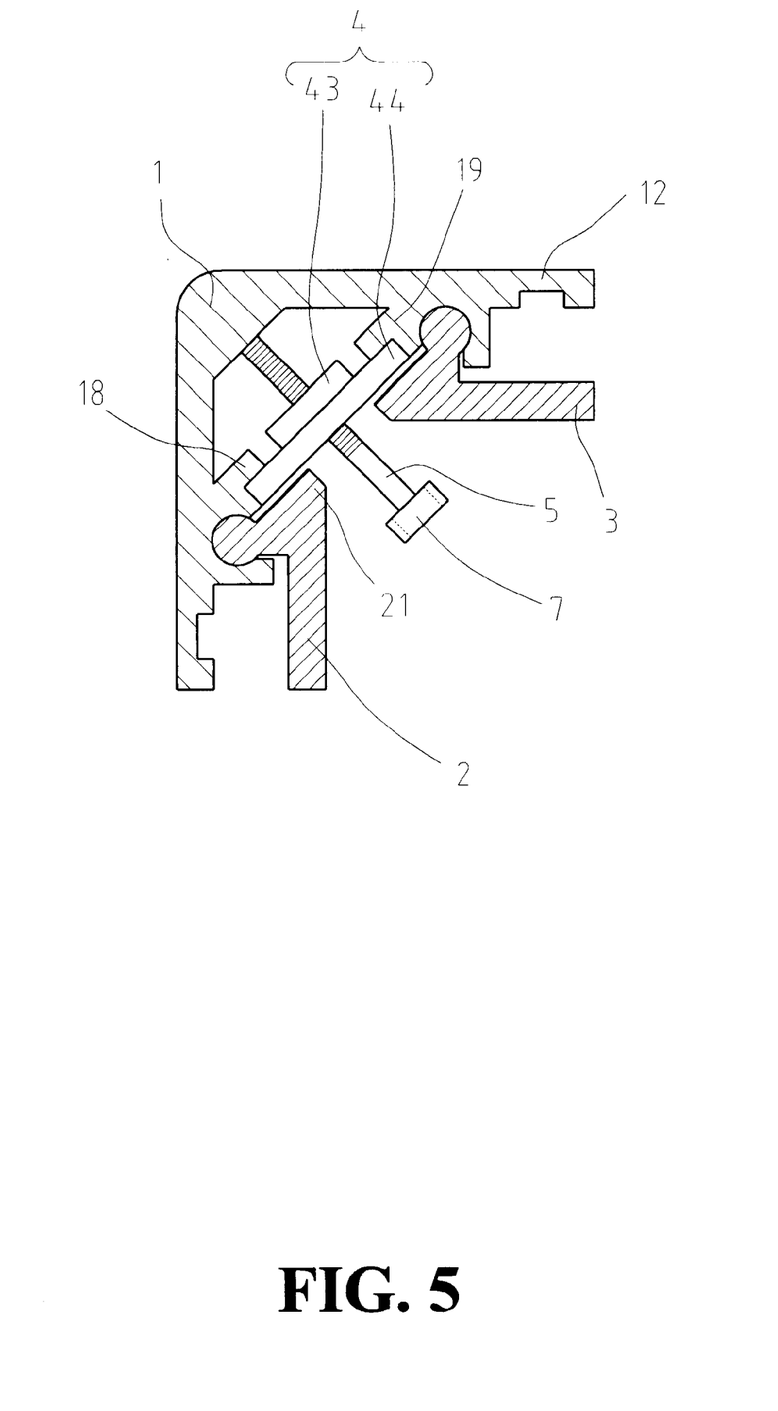
FIG. 5 is a cross-sectional view of the fastening device shown in FIG. 4.

FIGS. 4 and 5 show another embodiment of the present invention wherein the nut 4 is also comprised of first and second sections 43, 44. However, the first section 43 no longer forms snug engagement with the ribs 18, 19 to prevent the nut 4 from rotation. Instead, the second section 44 is formed with a polygonal configuration which in the embodiment illustrated is rectangular having two opposite edges forming engagement with the projections 15, 16 of the boards 11, 12 to prevent the nut 4 from rotation by the bolt 5. To this point, it is understood that the nut 4 may have any configuration that forms engagement with the projections 15, 16 of the boards 11, 12 to prevent the nut 4 from rotation when the bolt 5 is turned.

Figure 6:
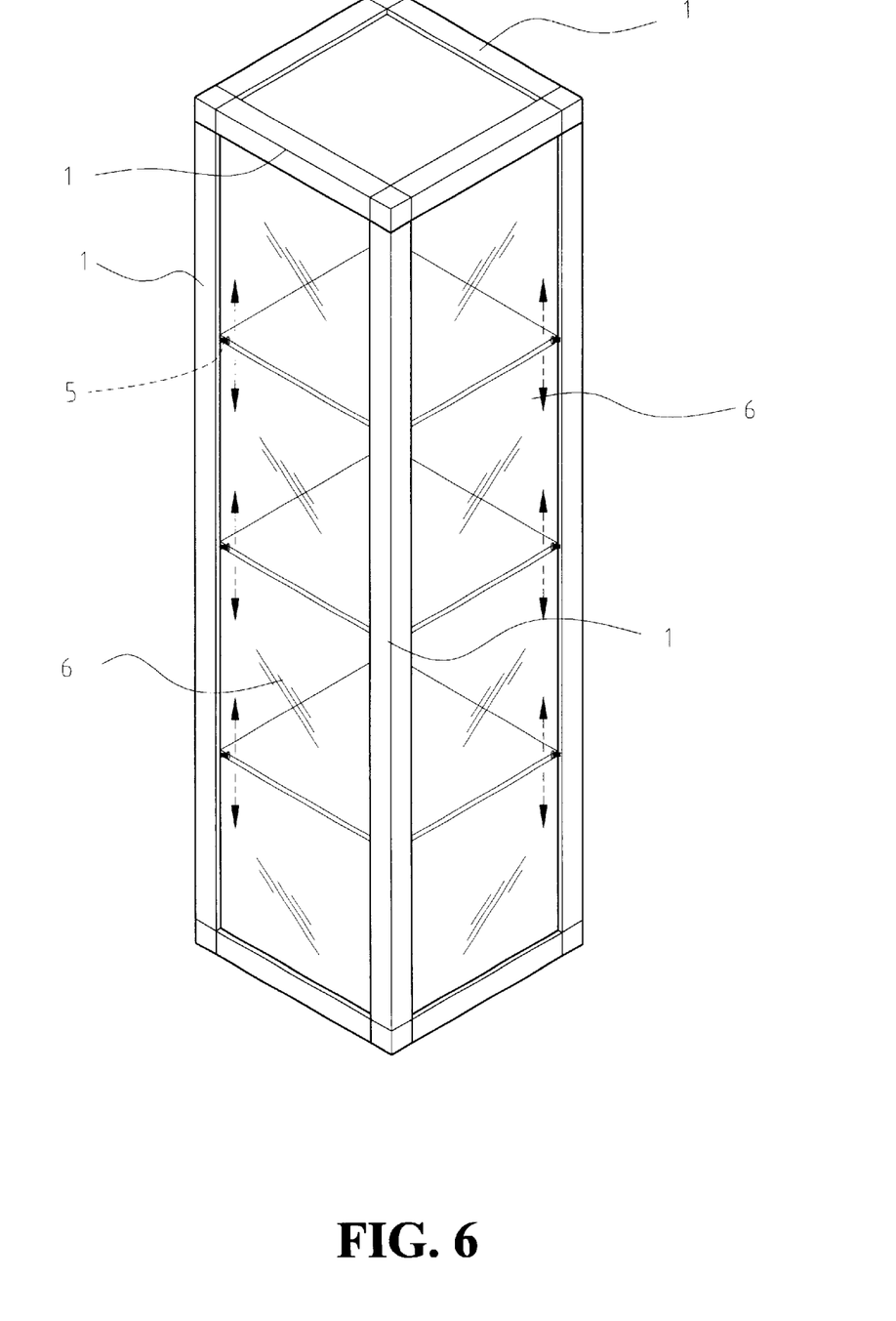
FIG. 6 is a perspective view of a cabinet in which the fastening device of the present invention is incorporated to secure panels of the cabinet.

It is also noted in FIGS. 4 and 5 that the bolt 5 has an extended, non-threaded section with an expanded free end or head 51. The purpose of the extended section of the bolt 5 is to allow the bolt 5 to substantially extend into the interior of for example a cabinet formed with the fastening device 1 as shown in FIG. 6. The head 51 that extends into the cabinet serves to support a partition board (not labeled) of the cabinet. As mentioned above, the bolt-nut set (5, 4) may be located at any desired position along the ribs 18, 19. Thus, the position of the partition board that is supported by the bolt 5 may be arbitrarily selected as indicated by arrows of FIG. 6.

To avoid damage to the partition board that is supported by the head 51 of the bolt 5 and to prevent undesired separation of the partition board from the bolt 5, a ring 7 is fit over the head 51 of the bolt 5. The ring 7 is made of a soft plastics or rubber that has a significant frictional coefficient with the partition board.

Figure 7:
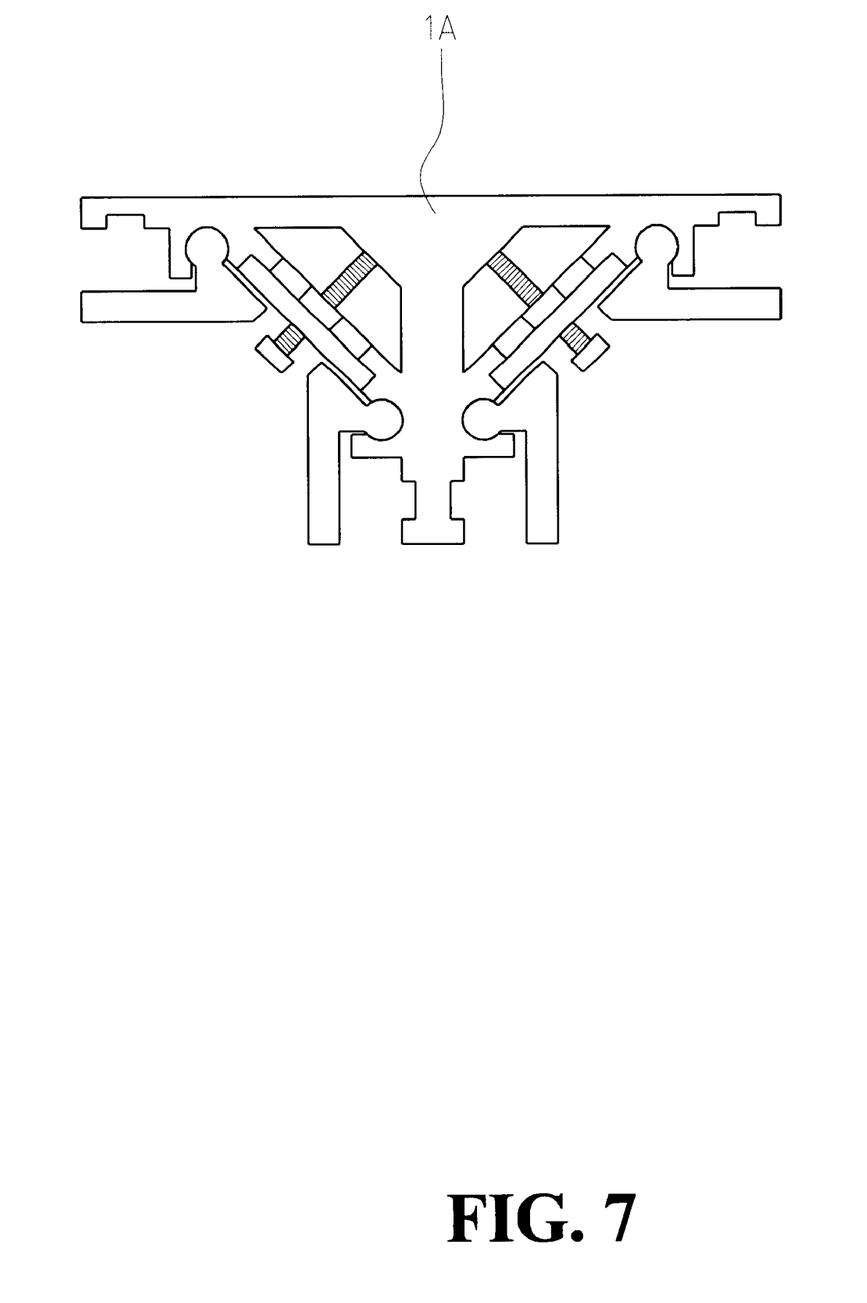
FIG. 7 is a first variation of the fastening device of the present invention.
Figure 8:
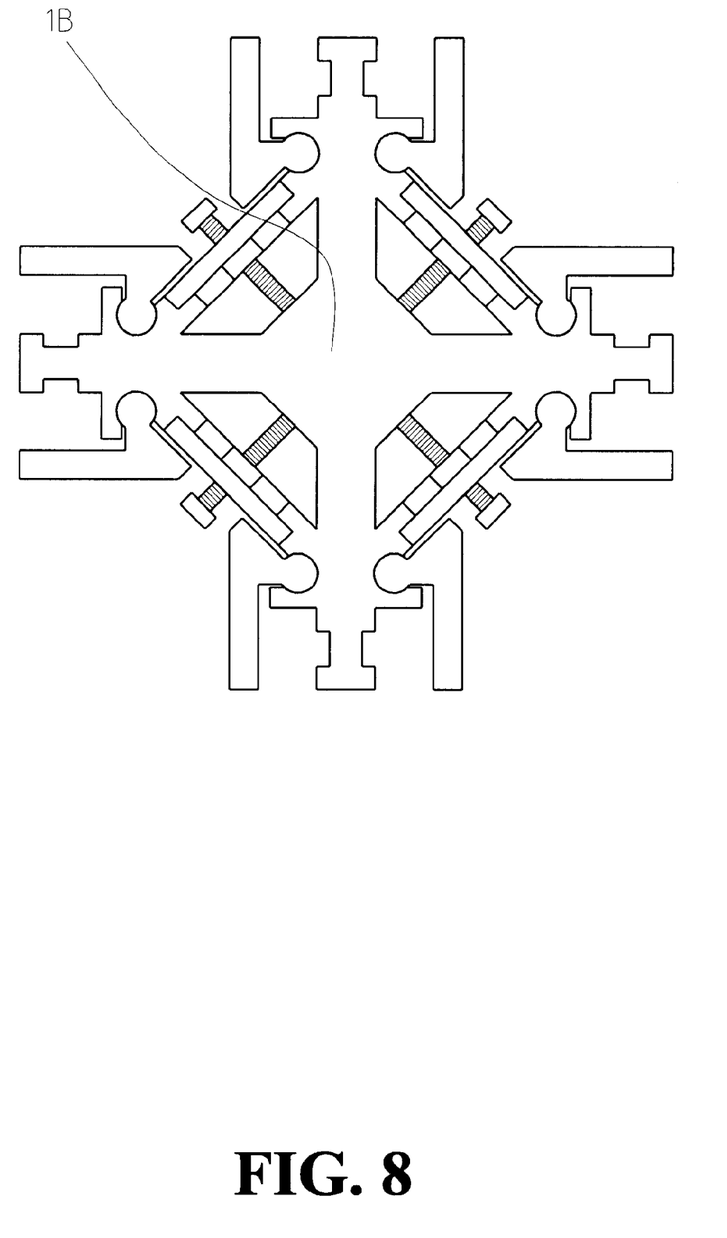
FIG. 8 is a second variation of the fastening device of the present invention.

FIG. 7 shows a first variation of the fastening device 1 of the present invention. The first variation that is designated with reference numeral 1A, comprises two fastening devices 1 with the side boards fixed together, forming a T-shaped configuration. FIG. 8 shows a second variation, designated with reference numeral 1B, comprises two T-shaped fastening devices shown in FIG. 7 fixed together to form a criciform configuration for securing four panels (not shown) oriented in four directions.

Figure 9A:
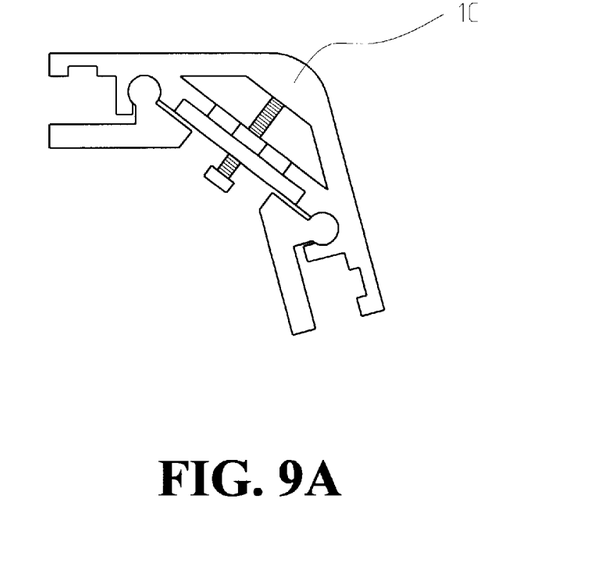
FIG. 9A is a third variation of the fastening device of the present invention.
Figure 9B:
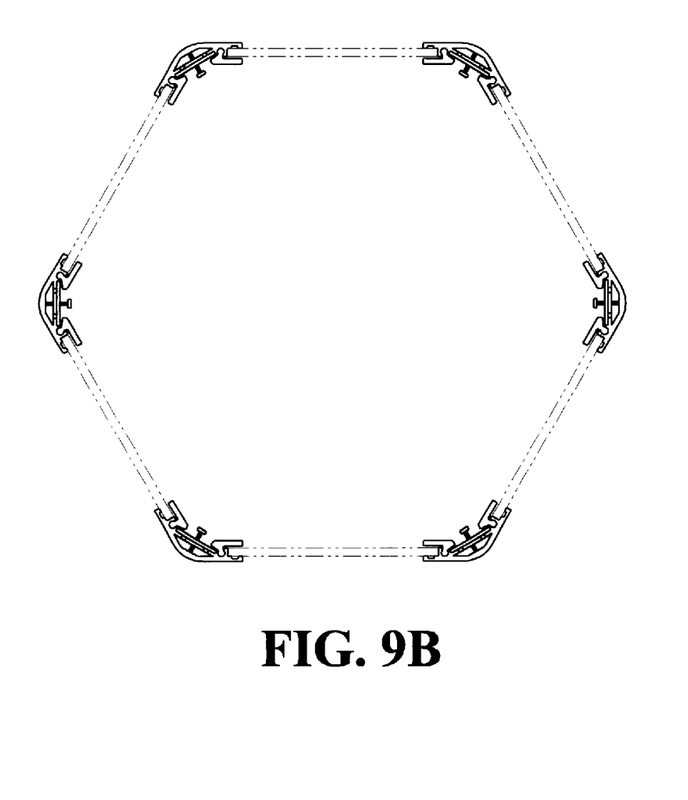
FIG. 9B is a cabinet having a hexagonal cross section constructed by means of the fastening device in accordance with the third variation of the present invention.

FIG. 9A shows a third variation, designated with reference numeral 1C, of the fastening device of the present invention wherein the included angle between the boards is not 90 degrees and is 120 degrees instead. By positioning the fastening devices 1C in six corners with panels fixed between adjacent fastening devices 1C, a cabinet having a hexagonal cross section is formed as shown in FIG. 9B. It is apparent that by arbitrarily selecting the included angle between the side boards of the fastening device, the fastening device can be employed to construct cabinet or cases of any desired configuration.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fastening device for securing panels comprising:
   two side boards attached to each other with an included angle therebetween;
   a securing member pivotally mounted to each side board with a space formed between the securing member and the associated side board for accommodating a panel therebetween;
   a nut rotatably fixed to and linearly movable with respect to the side boards, the nut being engageable with an edge protrusion of each securing member; and
   a bolt threadingly engaging the nut whereby when the bolt is turned, the nut is linearly moved with respect to the side boards and forcibly drives the securing members to rotate with respect to the boards and thus securing the panels between the securing members and the side boards.

2. The fastening device as claimed in claim 1, wherein each side board forms a projection, a cylindrical bore being defined in the projection, the bore forming a co-extensive side opening, and wherein the securing member forms a cylindrical rib rotatably received in the bore whereby the side opening allows the securing member to do limited rotation with respect to the side board.

3. The fastening device as claimed in claim 1, wherein the side boards form projections confronting each other, the projections having edges opposite to each other and wherein the nut having a polygonal section having opposite edges snugly received between the edges of the projections thereby rotatably fixing the nuts between the projections.

4. The fastening device as claimed in claim 3, wherein the nut comprises an expanded section engaging projecting edges of the securing members for forcibly driving the securing members toward the side boards to secure the panels.

5. The fastening device as claimed in claim 1, wherein the bolt has an expanded head over which a ring made of a soft and high friction material is fit.

6. The fastening device as claimed in claim 1, wherein the included angle between the side boards is substantially 90 degrees.

7. The fastening device as claimed in claim 1, wherein the included angle between the side boards is substantially 120 degrees.

8. A fastening system comprising two fastening devices fixed together, each fastening device comprising:
   two side boards attached to each other with an included angle therebetween;

a securing member pivotally mounted to each side board with a space formed between the securing member and the associated side board for accommodating a panel therebetween;

a nut rotatably fixed to and linearly movable with respect to the side boards, the nut engaging an edge protrusion of each securing member; and a bolt threadingly engaging the nut whereby when the bolt is turned, the nut is linearly moved with respect to the boards and forcibly drives the securing members to rotate with respect to the boards and thus securing the panels between the securing members and the side boards;

wherein one of the side boards of each fastening device is fixed together to form a T-shaped configuration.

9. The fastening system as claimed in claim 8 further comprising two fastening devices fixed to the T-shaped configuration to form a cruciform configuration.

* * * * *